(12) United States Patent
Fletcher et al.

(10) Patent No.: US 11,486,504 B2
(45) Date of Patent: Nov. 1, 2022

(54) CHECK VALVE INSERT DEFINING AN OPEN POSITION AND CHECK VALVES HAVING SAME

(71) Applicant: Dayco IP Holdings, LLC, Troy, MI (US)

(72) Inventors: David E. Fletcher, Flint, MI (US); Matthew C. Gilmer, South Lyon, MI (US); David Snow, Redford, MI (US); Chester E. Duffield, III, Warren, MI (US)

(73) Assignee: Dayco IP Holdings, LLC, Roseville, MI (US)

( * ) Notice: Subject to any disclaimer, the term of this patent is extended or adjusted under 35 U.S.C. 154(b) by 0 days.

(21) Appl. No.: 16/391,941

(22) Filed: Apr. 23, 2019

(65) Prior Publication Data

US 2019/0323618 A1 Oct. 24, 2019

Related U.S. Application Data

(60) Provisional application No. 62/661,165, filed on Apr. 23, 2018.

(51) Int. Cl.
*F16K 15/02* (2006.01)
*F16K 27/02* (2006.01)
(Continued)

(52) U.S. Cl.
CPC .......... *F16K 15/023* (2013.01); *F16K 25/00* (2013.01); *F16K 27/0209* (2013.01); *F02M 35/10229* (2013.01)

(58) Field of Classification Search
CPC . F16K 15/023; F16K 15/141; Y10T 137/7879
See application file for complete search history.

(56) References Cited

U.S. PATENT DOCUMENTS 4,729,401 A 3/1988 Raines
5,535,785 A * 7/1996 Werge .................. A61M 39/26
137/843

(Continued)

FOREIGN PATENT DOCUMENTS

EP 1995104 A2 11/2008
GB 829560 A * 3/1960 ........... F16K 15/141

OTHER PUBLICATIONS

WO, International Search Report and Written Opinion; International Application No. PCT/US2019/028726 (dated Aug. 1, 2019) (8 pages).

(Continued)

*Primary Examiner* — Reinaldo Sanchez-Medina
*Assistant Examiner* — Nicole Gardner
(74) *Attorney, Agent, or Firm* — FisherBroyles, LLP; Susan M. Oiler (57) ABSTRACT

Check valve inserts define a valve seat for an open position of a check valve and have an outer support seatable in an internal chamber of the check valve and have an inner annular ring spaced radially inward from the outer support by a rib that angles axially toward a central longitudinal axis to position an upper surface of the inner annular ring a distance axially beyond an upper surface of the outer support. Check valves have a housing defining an inlet port, an outlet port, and a chamber in fluid communication with the inlet and outlet ports, have the check valve insert seated with the chamber, and have a seal disc moveable within the chamber between the open position defined by the inner annular ring of the check valve insert and a closed position. The seal disc is translatable in response to a pressure difference across the seal disc.

17 Claims, 9 Drawing Sheets

(51) Int. Cl.
    *F16K 25/00*     (2006.01)
    *F02M 35/10*     (2006.01)

(56) References Cited

U.S. PATENT DOCUMENTS

| | | |
|---|---|---|
| 6,401,749 B1 | 6/2002 | Tai et al. |
| 9,534,704 B2 | 1/2017 | Hampton et al. |
| 9,581,258 B2 | 2/2017 | Fletcher et al. |
| 2013/0092864 A1 | 4/2013 | Andersson |
| 2014/0150905 A1* | 6/2014 | Sparazynski ......... B60T 13/567 |
| | | 137/512 |
| 2015/0354600 A1 | 12/2015 | Fletcher et al. |
| 2016/0010661 A1* | 1/2016 | Fletcher .................... F04F 5/20 |
| | | 417/174 |
| 2016/0030730 A1 | 2/2016 | Mosler et al. |
| 2016/0327169 A1 | 11/2016 | Yazykov |
| 2016/0356250 A1 | 12/2016 | Fletcher et al. |
| 2018/0080567 A1 | 3/2018 | Hampton et al. |

OTHER PUBLICATIONS

Supplementary European Search Report, EP19793160, dated Oct. 22, 2021 (pp. 10).

\* cited by examiner

CHECK VALVE INSERT DEFINING AN OPEN POSITION AND CHECK VALVES HAVING SAME

TECHNICAL FIELD

This application relates to check valves having an insert that defines a valve seat for an open position for a translatable seal disc translatable only in response to pressure differentials across the seal disc. The check valves may be standalone units or may be integral with a Venturi device as a check valve for a Venturi gap and/or a bypass port.

BACKGROUND

Engines, for example vehicle engines, have included aspirators or ejectors for producing vacuum, and/or check valves. Typically, the aspirators are used to generate a vacuum that is lower than engine manifold vacuum by inducing some of the engine air to travel through a Venturi gap. The aspirators may include check valves therein or the system may include separate check valves. As shown in co-owned U.S. Pat. No. 9,534,704, issued Jan. 3, 2017, and U.S. Pat. No. 9,581,258, issued Feb. 28, 2017, each check valve, whether built into a Venturi device or as a separate check valve unit, includes a first valve seat defined by a plurality of radially spaced apart fingers to form a support/seat for a translatable seal disc that defines the open position of the check valve and a second valve seat that defines the closed position of the check valve. In these check valve units, the first and second valve seats are integrally molded components of the housing that defines the internal chamber of the check valve unit, and as a molded component are made of the same durable material as the housing.

The above-described check valve units can be improved, as disclosed herein, to reduce the stress on the translatable seal disc, which is a result of the shape, spacing, and material of the plurality of radially spaced apart fingers as well as the pressure applied to the seal disc by the pressure differential in the system. Thus, there is a need to improve the first valve seat to reduce the stress on the seal disc, and a need to improve the ease manufacture and assembly of a check valve unit.

SUMMARY

In all aspects, check valve inserts are disclosed herein that are insertable and seatable in a chamber of a check valve unit. Each check valve insert has an outer support seatable in an internal chamber of a check valve unit and having an upper surface and a lower surface, and an inner annular ring spaced radially inward from the outer support by a rib that angles axially toward a central longitudinal axis to position an upper surface of the inner annular ring a distance axially beyond the upper surface of the outer support. The inner annular ring defines a first seat for an open position of the check valve unit.

In all aspects, the outer support is an annular ring or a polygonal-shaped ring and the inner annular ring is circular or oval in shape. Also, the upper surface of the inner annular ring is a continuous surface in one plane perpendicular to the central longitudinal axis, undulates with two opposing troughs, or is angled downward and radially outward toward the outer support over a minor arc extending 20 degrees up to 170 degrees. Further, a plurality of circumferentially spaced apart ribs space the inner annular ring from the outer support.

In another aspect, any of the check valve inserts described above is seated in a chamber of a check valve unit. The check valve unit has a housing defining an inlet port, an outlet port, and the chamber, which is in fluid communication with the inlet port and the outlet port, thereby defining a flow path from the inlet port through the chamber to the outlet port. The chamber defines a seal seat for a closed position and has a shoulder protruding inward. The check valve insert is seated on the shoulder in the chamber and a seal disc translatable within the chamber is present that translates in response to a pressure difference across the seal disc itself between an open position seated on the upper surface of the inner annular ring of the check valve insert and the closed position.

In one embodiment, the outlet port of the check valve unit is a Venturi gap of a Venturi device or a bypass port of a Venturi device. The bypass port may be positioned downstream of a Venturi gap.

In another aspect, any of the check valve inserts described above is seated in a chamber of a Venturi device. The Venturi device has a body defining a passageway having a motive section and a discharge section spaced a distance apart from one another to define a Venturi gap, both of which converge toward the Venturi gap, and defining a chamber housing the Venturi gap and having a first suction port in fluid communication with the Venturi gap. The chamber has a first shoulder protruding inward and positioned a pre-selected distance between the Venturi gap and the first suction port. The check valve insert is seated on the shoulder in the chamber and a seal disc translatable within the chamber is present that translates in response to a pressure difference across the seal disc itself between an open position seated on the upper surface of the inner annular ring of the check valve insert and the closed position. The Venturi device include a first suction housing sealingly connected to the first suction port to collectively form a first check valve chamber, and the suction housing defines a valve seat for the closed position.

In all aspects, the body of the Venturi device further defines a second suction port in fluid communication with the Venturi gap and either a cap sealingly connected to the second suction port or a second suction housing sealingly connected to the second suction port to collectively form a second check valve chamber. When the second suction housing is present, the chamber of the body has a second shoulder protruding inward and positioned a pre-selected distance between the Venturi gap and the second suction port and a second check valve insert seated on the second shoulder in the chamber. The second check valve insert is any of the check valve inserts described above. Further, a second seal disc translatable in response to a pressure difference across the second seal disc is present within the second check valve chamber and translates between an open position seated on the upper surface of the inner annular ring of the second check valve insert and a closed position.

In all aspects of the Venturi device, an outlet end of the motive section extends into the chamber defined by the body at a position where the chamber provides fluid flow around the entire outer surface of the outlet end, and an inlet end of the discharge section extends into the chamber at a position where the chamber provides fluid flow around the entire outer surface of the inlet end of the discharge section. Also, the body may define a bypass port downstream of the first suction port.

DETAILED DESCRIPTION

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

Figure 1:
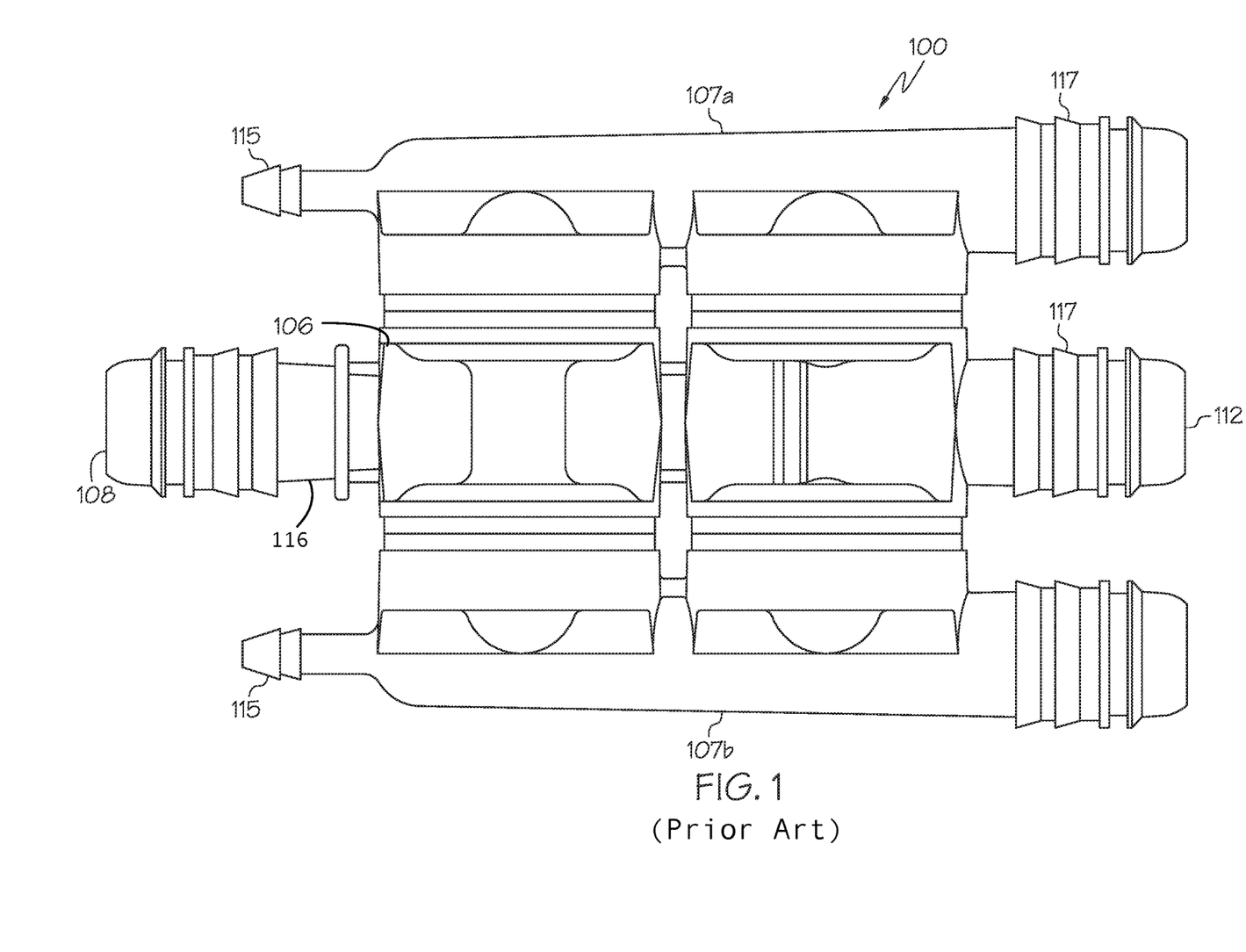
FIG. 1 is a side view of one embodiment of a Venturi device.

FIG. 1 is an external view of a Venturi device, generally identified by reference number 100, for use in an engine, for example, a vehicle's engine. The engine may be an internal combustion engine that includes a device requiring a vacuum 102 represented in FIG. 2. Check valves are normally employed in vehicle systems in the air flow lines, for example, between the intake manifold, downstream of the throttle, and the devices requiring vacuum. The engine and all its components and/or subsystems are not shown in the figures, with the exception of a few boxes included to represent specific components of the engine as identified herein, and it is understood that the engine components and/or subsystems may include any commonly found in vehicle engines. For example, a source of motive flow is fluidly connected to a motive section 116 of the Venturi device 100, which may be atmospheric pressure or boosted pressure. While the embodiments in the figures are referred to as aspirators because the motive section 116 is connected to atmospheric pressure, the embodiments are not limited thereto. In other embodiments, the motive section 116 may be connected to boosted pressure, such as the pressures attributed to boosted air produced by a turbocharger, and as such the "aspirator" is now preferably referred to as an "ejector."

Figure 2:
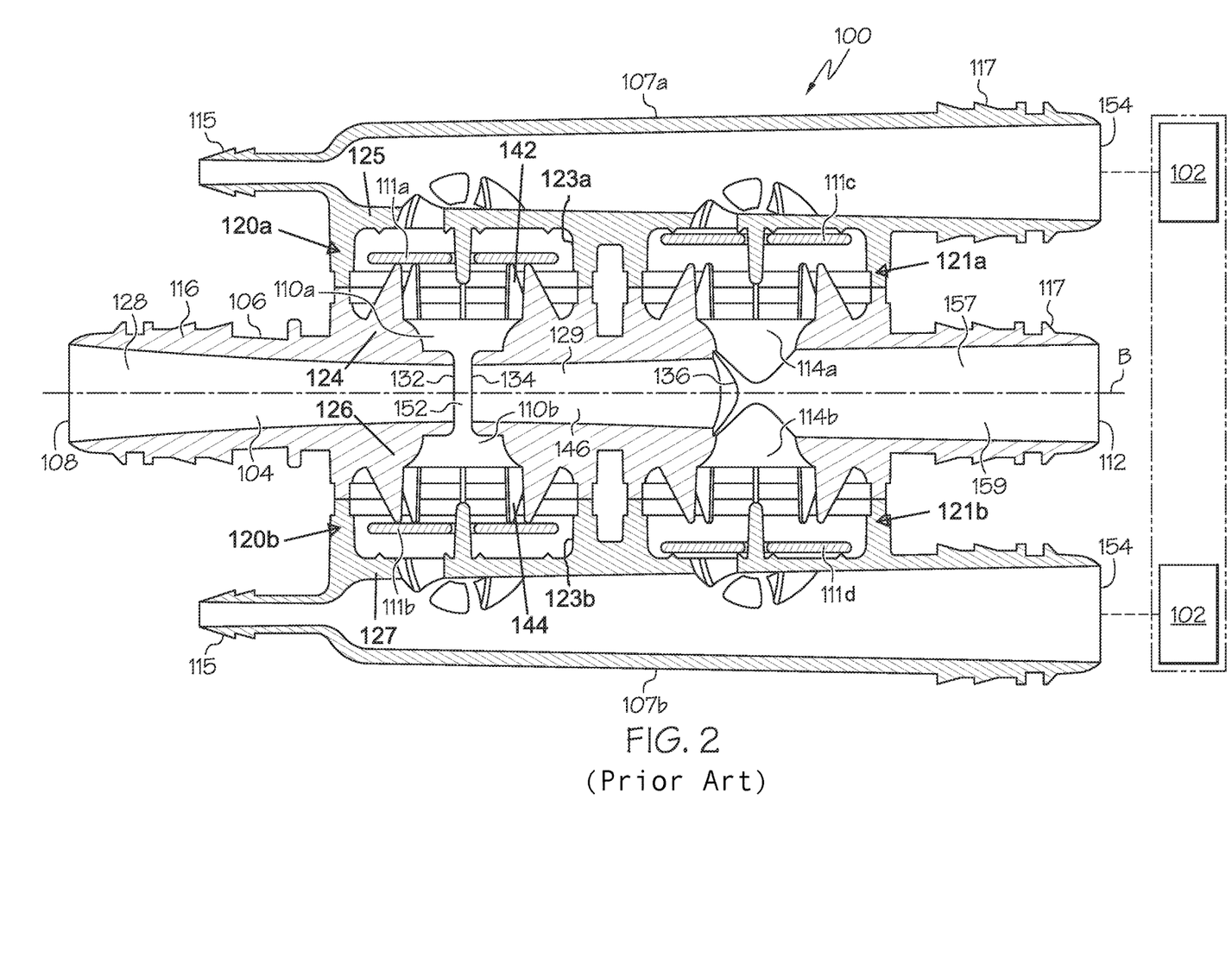
FIG. 2 is a side, longitudinal cross-sectional, plan view of the Venturi device of FIG. 1.

Referring to FIGS. 1 and 2, the Venturi device 100 is connected to a device requiring vacuum 102, and the Venturi device 100 creates vacuum for said device 102 by the flow of air through a passageway 104, extending generally the length of the body 106, designed to create the Venturi effect. Passageway 104 has four or more ports that are connectable to an engine or components connected thereto. The ports include: (1) a motive port 108, which may be connected to a source of clean air, e.g., from the engine intake air cleaner, that is positioned upstream of a throttle; (2 and 3) a pair of suction ports 110a, 110b; (4) a discharge outlet 112, which may be connected to an engine intake manifold downstream of the throttle of the engine; and, optionally, (5) one or more bypass ports 114a, 114b. The motive fluid flow through the passageway 104 travels from the motive port 108 (high pressure) toward the discharge outlet 112 (low pressure). In the illustrated embodiment, the suction ports 110a, 110b are each in fluid communication with a port 154 and an optional auxiliary port 115 via suction housings 107a and 107b, respectively. The ports 154 may function as inlets connecting the Venturi device to a device requiring vacuum 102. In one embodiment, the device requiring vacuum may be one device connected to both ports 154, or two separate devices each connected to one port 154 as shown in FIG. 2. An additional device requiring vacuum may be connected to one or more of the auxiliary ports 115. Each of the respective ports 108, 112, 115, and 154 may include a connector feature 117 on the outer surface thereof for connecting the respective port to a hose or other component in the engine.

In FIGS. 1 and 2, the body 106 is connected to the upper suction housing 107a and to the lower suction housing 107b with sealingly tight connections. In the illustrated embodiment, upper housing portion 107a and lower housing portion 107b are identical aside from their attachment locations relative to the body 106, but suction housings 107a, 107b need not be identical nor are they required to include all of the same components (for example, in an embodiment with only one bypass port 114, the pertinent features of one of the suction housings 107a, 107b, and the corresponding connective features of body 106, are omitted). The designations of upper, lower, and middle portions are relative to the drawings as oriented on the page, for descriptive purposes, and are not limited to the illustrated orientation when utilized in an engine system. The upper and lower suction housings are joined to the body 106, for example by sonic welding, heating, or other conventional methods for forming an airtight or fluidtight seal therebetween.

Still referring to FIGS. 1 and 2, in the illustrated embodiment, check valves 120a and 120b and 121a and 121b are integrated into the Venturi device 100 between the suction housings 107a and 107b and their respective suction ports 110a and 110b and bypass ports 114a and 114b. Alternately, any one or more of the check valves 120a, 120b, 121a, 121b may be omitted or may be provided as an external component of an aspirator system. Check valves 120a, 120b are preferably arranged to prevent fluid from flowing from the suction ports 110a, 110b to the application device 102. In one embodiment, the device requiring vacuum 102 is a vehicle brake boost device, a fuel vapor purging system, an automatic transmission, or pneumatic or hydraulic valve, but is not limited thereto.

The check valves 120a, 120b each include a first valve seat 124, 126 as part of the body 106. The first valve seat 124 defines the first suction port 110a, and the second valve seat 126 defines the second suction port 110b, which both allow for air flow communication with air passageway 104. In FIG. 2, the first valve seat 124 includes a plurality of radially spaced fingers 142 and the second valve seat 126 includes a plurality of radially spaced fingers 144 extending into a cavity 123a, 123b defined by the check valves 120a, 120b to form a support/seat for a seal disc 111a, 111b. The check valves 120a, 120b also include a second valve seat 125, 127 as part of the suction housings 107a and 107b against which the seal disc 111a, 111b can be seated, for example, in a closed position of the check valve. Similarly, check valves 121a, 121b for the bypass ports 114a, 114b include generally the same components as check valves 120a and 120b and as such, the labels are not repeated in the drawings other than for seal discs 111c, 111d.

The body 106 defines passageway 104 along a central longitudinal axis B bisected by the suction ports 110a, 110b. The inner passageway 104 includes a first tapering portion 128 (also referred to herein as the motive cone) in the motive section 116 of the body 106 coupled to a second tapering portion 129 (also referred to herein as the discharge cone) in the discharge section 146 of the body 106. Here, the first tapering portion 128 and the second tapering portion 129 are aligned end to end having the motive outlet end 132 facing the discharge inlet end 134 and defining a Venturi gap 152 therebetween, which defines a fluid junction placing the suction ports 110a, 110b generally opposite one another and each in fluid communication with the Venturi gap, and, hence, both the motive section 116 and the discharge section 146. The Venturi gap 152 as used herein means the lineal distance of the void between the motive outlet end 132 and the discharge inlet end 134. The interior surface of the motive outlet end 132 and the discharge inlet end 134 are both ellipse-shaped but may alternately have a polygonal form or other curved form.

The bypass ports 114a, 114b may intersect the second tapering section 129 adjacent to, but downstream of, the discharge outlet end 136. The body 106 may thereafter, i.e., downstream of this intersection of the bypass port 114, continue with a cylindrically uniform inner diameter until it terminates at the aspirator outlet 112. In another embodiment (not shown), the bypass ports 114a, 114b and/or the suction ports 110a, 110b may be canted relative to axis B and/or to one another. In the embodiment of FIGS. 1 and 2, the suction ports 110a, 110b and the bypass ports 114a, 114b are aligned with one another and have the same orientation relative to the body's central longitudinal axis B. In another embodiment, not shown, the suction ports 110a, 110b and the bypass ports 114a, 114b may be offset from one another and can be positioned relative to components within the engine that they will connect to for ease of connection. The disclosed system, incorporating a pair of suction ports 110a, 110b on either side of the Venturi gap 152, also provides improved suction flow rate for a given motive flow and discharge pressure as compared to a system incorporating a single suction port 110 because the disclosed system provides greater capacity to utilize the Venturi effect created by the motive flow through passageway 104.

Figure 3:
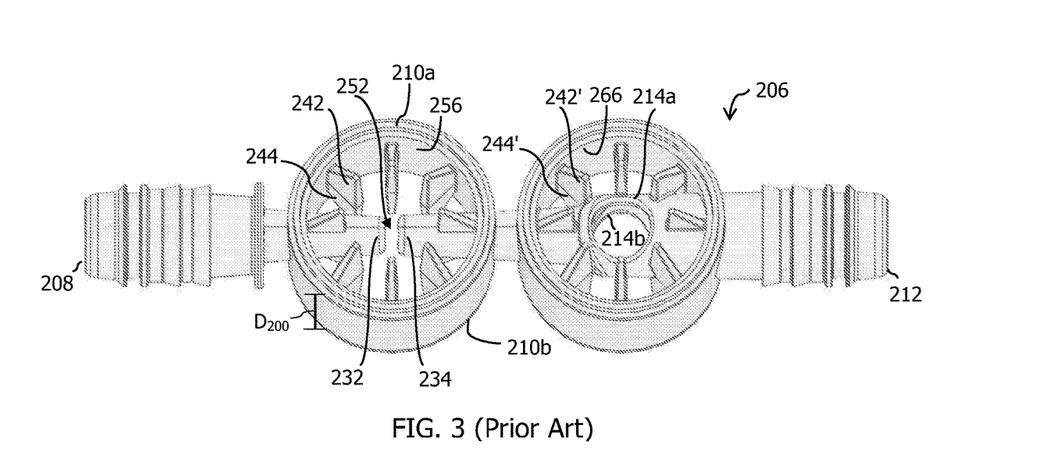
FIG. 3 is a side, perspective view of an alternate embodiment of just the body of the Venturi device of FIG. 2.

Referring now to FIG. 3, an alternate embodiment of the body of a Venturi device, generally designated 206, is disclosed. The body 206 defines a passageway generally equivalent to passage 104 described above and has a variety of ports including a motive port 208, a pair of suction ports 210a, 210b, a discharge outlet 212, and dual bypass ports 214a, 214b. As shown in FIGS. 1 and 2, the body 206 is mateable to suction housings 107a, 107b to together form at least one check valve, and may have any combination thereof, including all four check valves as shown in FIG. 2. The body 306 further defines a chamber 256 spacing the first suction port 210a and the second suction port 210b apart from one another by a distance $D_{200}$. The motive outlet end 232 extends into the chamber 256 at a position where the chamber 256 provides fluid flow around the entire outer surface of the motive outlet end 232, and the discharge inlet end 234 extends into the chamber 256 at a position where the chamber 256 provides fluid flow around the entire outer surface of the inlet end 234. The width of the Venturi gap 252 tapers symmetrically generally proximate the first suction port 210a and the second suction port 210b (the widest points) toward a central point therebetween, as described in co-owned U.S. application Ser. No. 14/734,228, filed Jun. 9, 2015. Accordingly, the Venturi gap 252 is wider proximate both the first suction port 210a and the second suction port 210b than at a generally central point between the first and second suction ports 210a, 210b.

The chamber 256 defined by the body 306 includes a plurality of fingers 242 extending radially inward and axially away (upward in the figures) from the passageway of the body 206. The plurality of fingers 242 are arranged radially as protrusion from an inner wall of the chamber 256 in an orientation where immediately adjacent neighboring fingers are spaced a distance apart from one another. The plurality of fingers 242 define a seat for a seal disc as part of check valve, such as check valve 120a. Similarly, the check valve 121a, if the bypass port(s) 214a is present, has a chamber 266 defined by the body 206 that includes a plurality of fingers 242' extending radially inward and radially away (upward in the drawings) from the passageway of the body 206 that collectively define a seat for a seal disc. The plurality of fingers 242' are arranged radially as protrusion from an inner wall of the chamber 266 in an orientation where immediately adjacent neighboring fingers are spaced a distance apart from one another. Each of the plurality of fingers 242, 242' has a base that is wider than at an apex thereof.

The apexes of the plurality of fingers 242 collectively define the seat for the seal disc for an open position, and the apexes of fingers 242' define the seat for a second seal disc for an open position. In the embodiment of FIG. 2, since check valves 120b and 121b are present, each of the plurality of fingers 242 in the embodiment of FIG. 3 include a mirror image finger 244 beginning at its base and projecting axially away from the base and terminating at an apex. The mirror image fingers 244 are integral with the fingers 242. The apexes of the mirror image fingers 244 collectively define the seat for another seal disc 111b. Similarly, the mirror image fingers 244', if the fingers 242' are present, are integral with the plurality of fingers 242', begin at the base thereof, and extend axially away from the base thereof (downward in the figures). The apexes of the plurality of mirror image fingers 244' define the seat for seal disc 111d.

Figure 4:
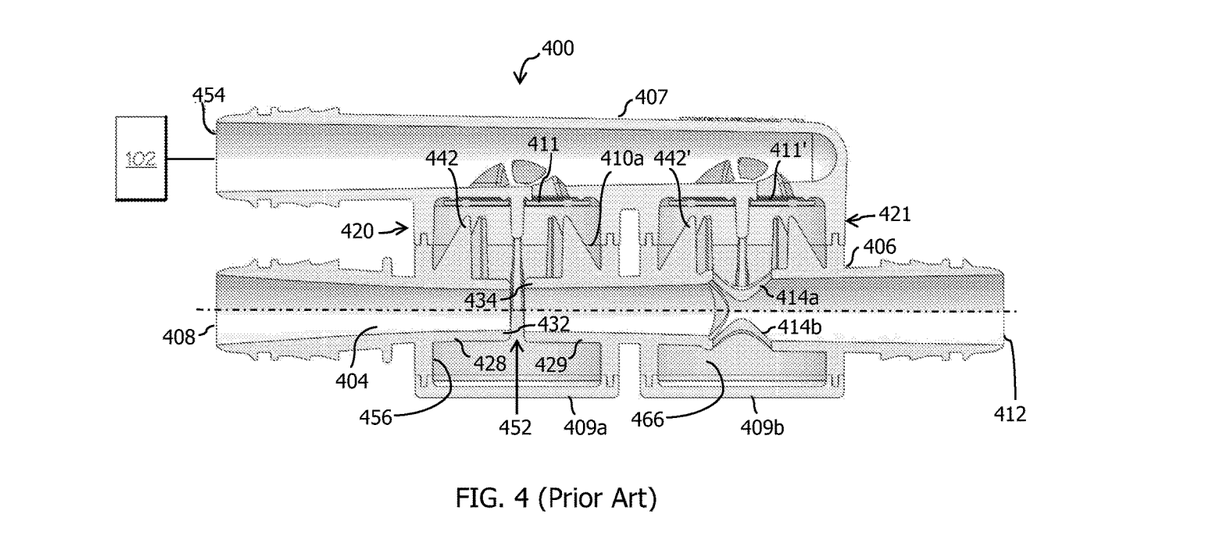
FIG. 4 is a side, longitudinal cross-sectional, plan view of another embodiment of a Venturi device.
Figure 5:
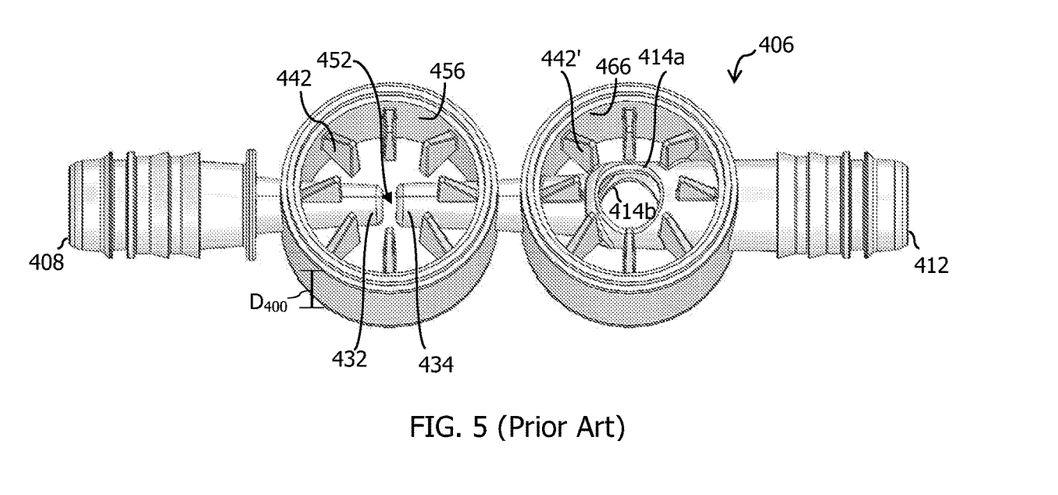
FIG. 5 is a side, perspective view of just the body of the Venturi device of FIG. 4.

Referring now to FIGS. 4 and 5, an alternate embodiment of a Venturi device, generally designated 400, is disclosed. The Venturi device 400 is connected to a device requiring vacuum 102 and includes a body 406 defining passageway 404 and having a variety of ports including a motive port 408, a pair of suction ports 410a, 410b, an aspirator outlet 412, a suction housing 407 connected to the body 406 with fluidtight/airtight seals, for example by sonic welding, heating, or other conventional methods for forming such seals therebetween, and, optionally, dual bypass ports 414a, 414b. The suction housing 407 and the body 406, together, form check valve 420 and/or 421, which if present include a seal disc 411, 411', respectively. Additionally, Venturi device 400 includes a first cap 409a and a second cap 409b defining an end of the chamber 456 and an end of chamber 466, respectively. The first and second caps 409a, 409b are connected thereto with fluidtight/airtight seals, for example by sonic welding, heating, or other conventional methods for forming such seals. Components of the Venturi device 400 not described below are understood to be analogous to those described above with respect to the other embodiments.

The body 406 defines passageway 404 along a central longitudinal axis bisected by the suction ports 410a, 410b. The inner passageway 404 includes a first tapering portion 428 and the second tapering portion 429 aligned end to end with the motive outlet end 432 facing the discharge inlet end 434 and defining a Venturi gap 452 therebetween. The body 406 further defines a chamber 456 spacing the first suction port 410a and the second suction port 410b apart from one another by a distance $D_{400}$ labeled in FIG. 5. The motive outlet end 432 extends into the chamber 456 at a position where the chamber 456 provides fluid flow around the entire outer surface of the motive outlet end 432, and the discharge inlet end 434 extends into the chamber 456 at a position where the chamber 456 provides fluid flow around the entire outer surface of the inlet end 434.

The chamber 456 defined by the body 406 includes a plurality of fingers 442 extending radially inward and axially away (upward in the figures) from the passageway 404 of the body 406. The plurality of fingers 442 are arranged radially as protrusion from an inner wall of the chamber 456 in an orientation where immediately adjacent neighboring fingers are spaced a distance apart from one another. The plurality of fingers 442 define a seat for the seal disc 411 as part of check valve 420. Similarly, the check valve 421, if the bypass port(s) 414a, 414b are present, has a chamber 466 defined by the body 406 that includes a plurality of fingers 442' extending radially inward and radially away (upward in the drawings) from the passageway 404 of the body 406 that collectively define a seat for the seal disc 411'. The plurality of fingers 442' are arranged radially as protrusion from an inner wall of the chamber 466 in an orientation where immediately adjacent neighboring fingers are spaced a distance apart from one another. Each of the plurality of fingers 442, 442' has a base that is wider than at an apex thereof. The apexes of the plurality of fingers 442 collectively define the seat for the seal disc 411 for an open position, and the apexes of fingers 442' define the seat for seal disc 411' for an open position.

The Venturi devices described above are very durable and effective for producing vacuum for an engine. Improvements, however, are always desirable, especially if the improvement can lengthen the lifetime wear of a component of the device. After much testing and trials, it has been found that the discontinuous or interrupted surface that the plurality of fingers 142, 242, 244, and 442 define as the first valve seat for the seal disc 111, 411 contributes stress to the seal disc 111, 411 over the life of the Venturi device. As such, an improvement has been developed, as shown in FIGS. 6-13, that reduces the stress on the seal disk 511 by providing a continuous surface as the first valve seat 524 against which the seal disc 511 seats in an open position of the check valve. This improvement not only reduces the stress on the seal disc over the life of the Venturi device, it provides a reduction in air flow resistance or restriction as the air flows through the check valve.

Furthermore, by making the first valve seat 524 part of a check valve insert 505 additional advantages have been realized. The check valve insert 505 can be made of a different material than the body 506 and/or the suction housing 507. The material selected for the check valve insert 505 is less abrasive and/or less rigid than the material selected for the body 506 and/or the suction housing 507. For example, the body 506 and/or the suction housing 507 may be made of a high glass fiber-filled plastic or a mineral filled plastic. In contrast, the check valve insert 505 may now be made of pure plastics (non-filled plastics) or rubbers, such as EPDM. Another advantage is the ability to select a check valve insert 505 from a plurality of configurations (see FIGS. 6-12) to tailor the performance characteristics of the Venturi device to the system in which it will operate.

Figure 6:
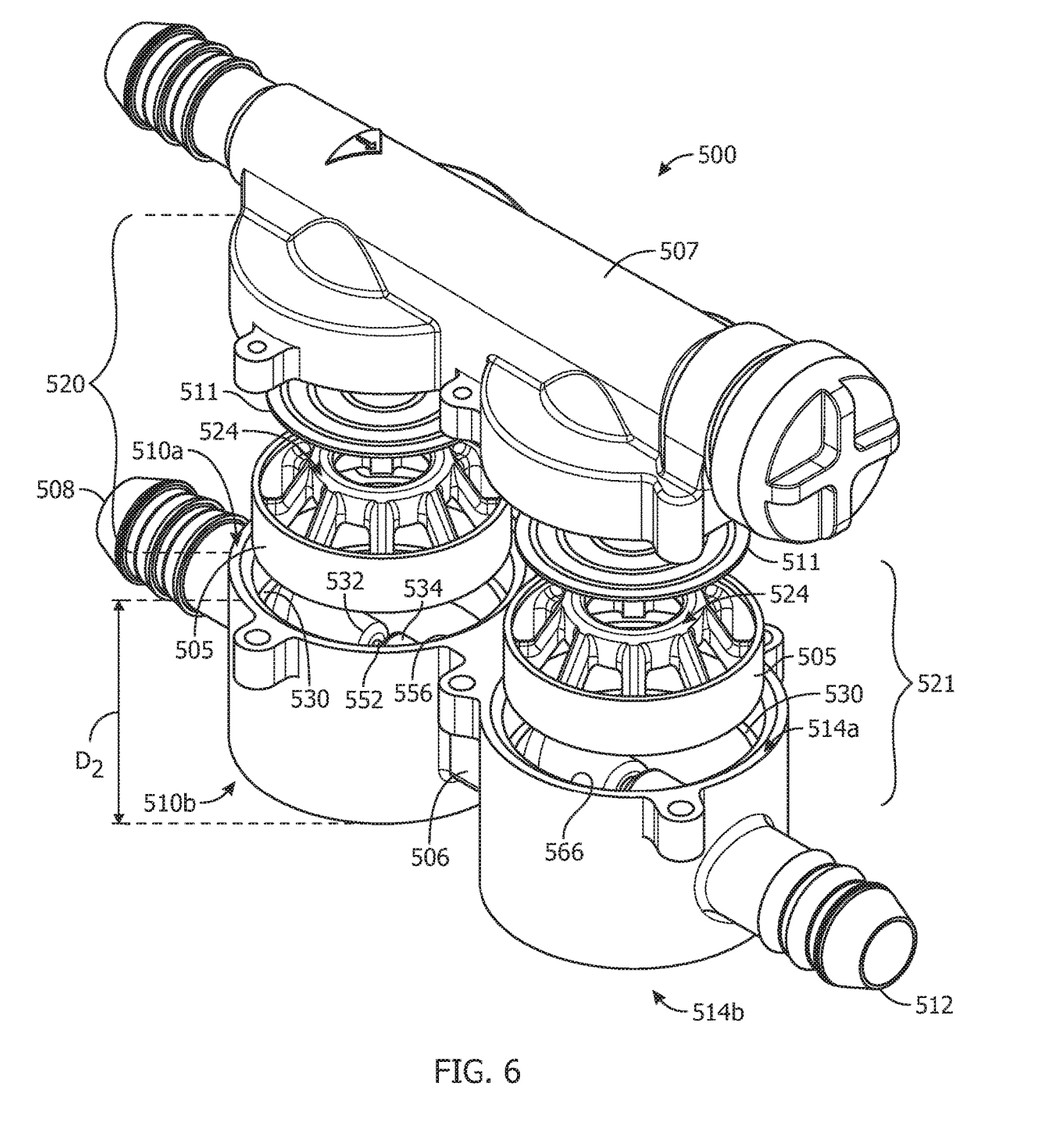
FIG. 6 is a side, perspective, exploded view of an improved embodiment of a Venturi device.
Figure 7:
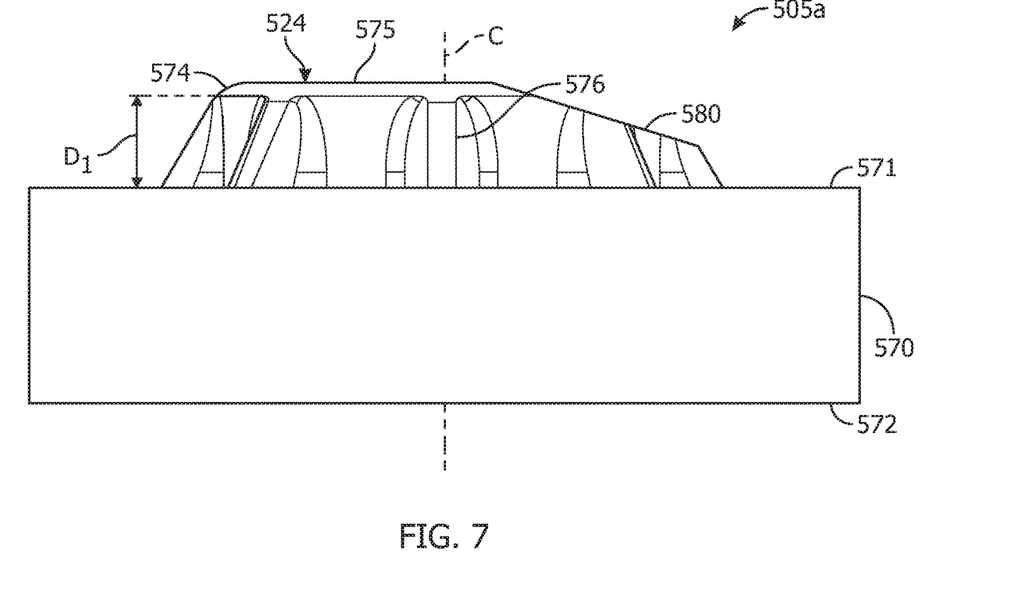
FIG. 7 is a side, plan view of a first embodiment of a check valve insert.
Figure 8:
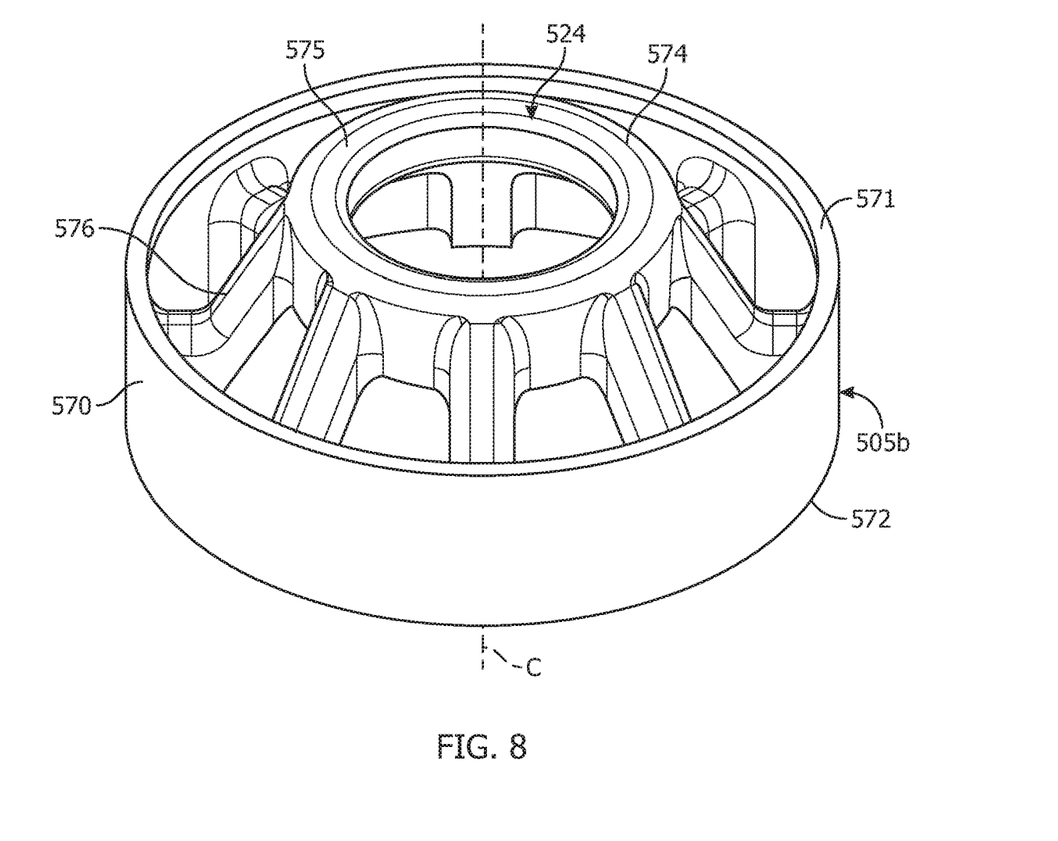
FIG. 8 is a side, perspective view of a second embodiment of a check valve insert.
Figure 9:
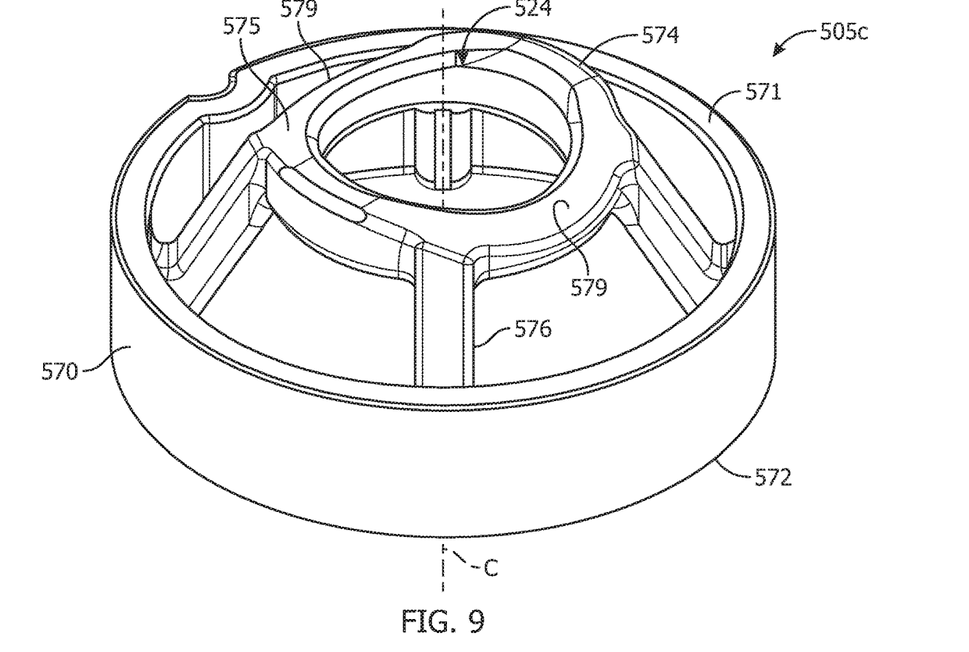
FIG. 9 is a side, perspective view of a third embodiment of a check valve insert.
Figure 10:
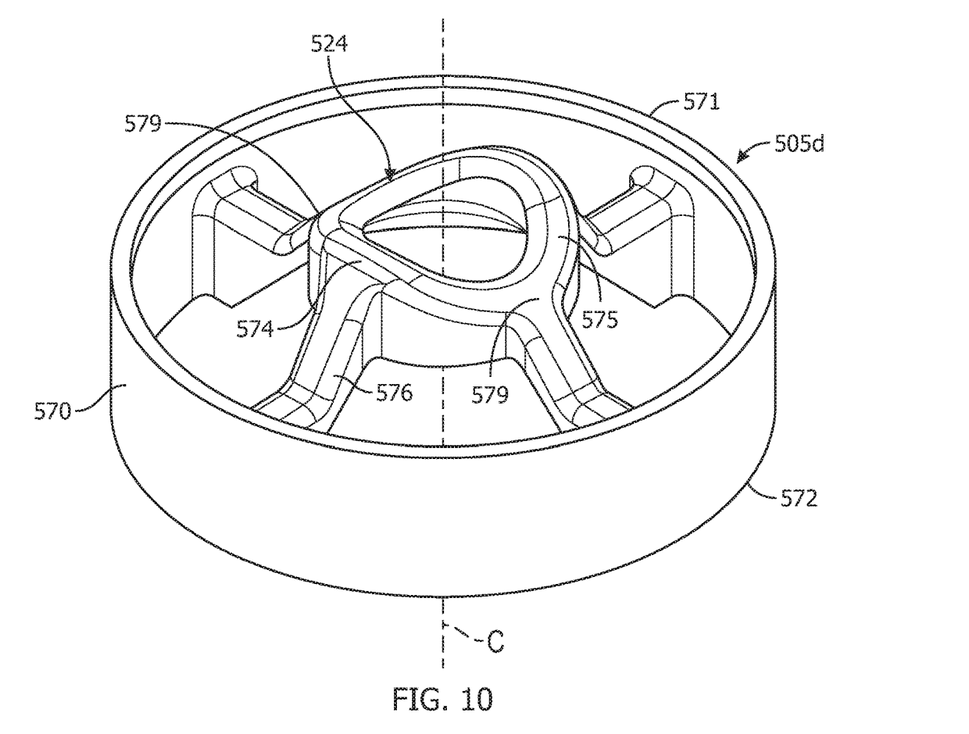
FIG. 10 is a side, perspective view of a fourth embodiment of a check valve insert.
Figure 11:
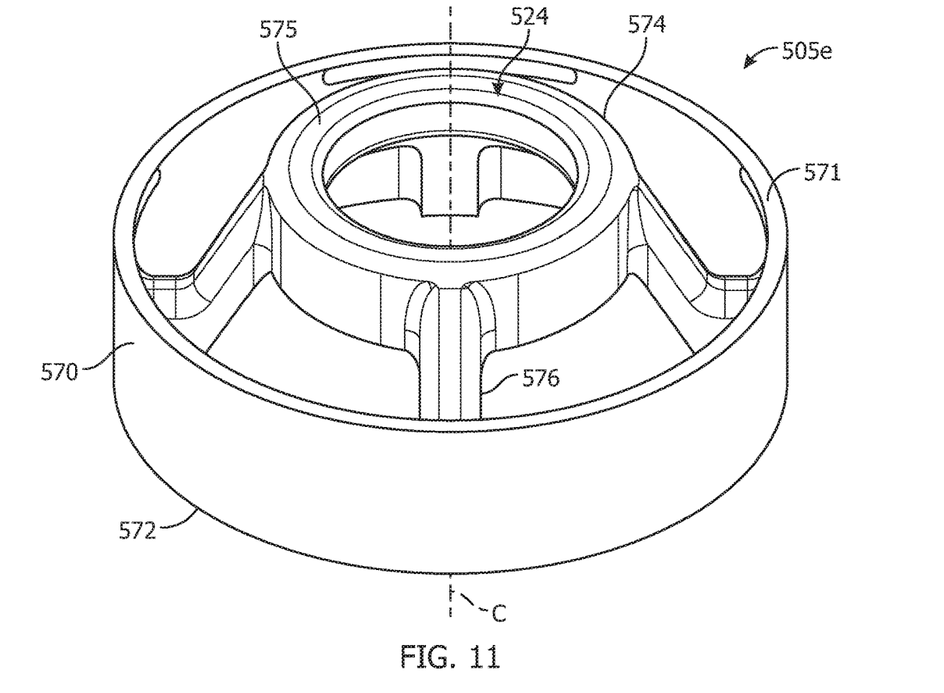
FIG. 11 is a side, perspective view of a fifth embodiment of a check valve insert.
Figure 12:
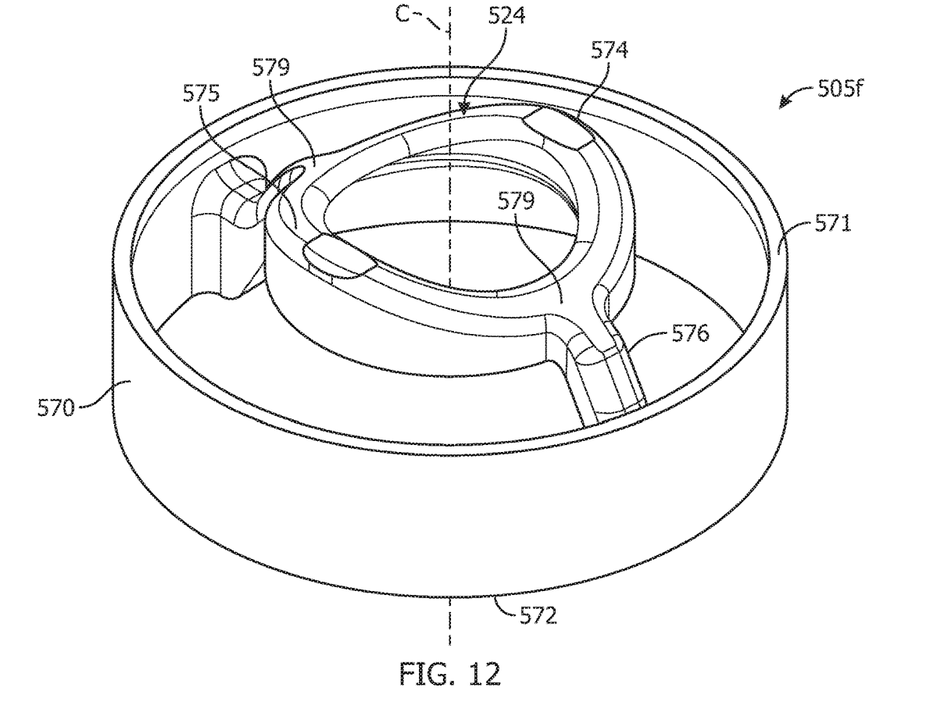
FIG. 12 is a side, perspective view of a sixth embodiment of a check valve insert.
Figure 13:
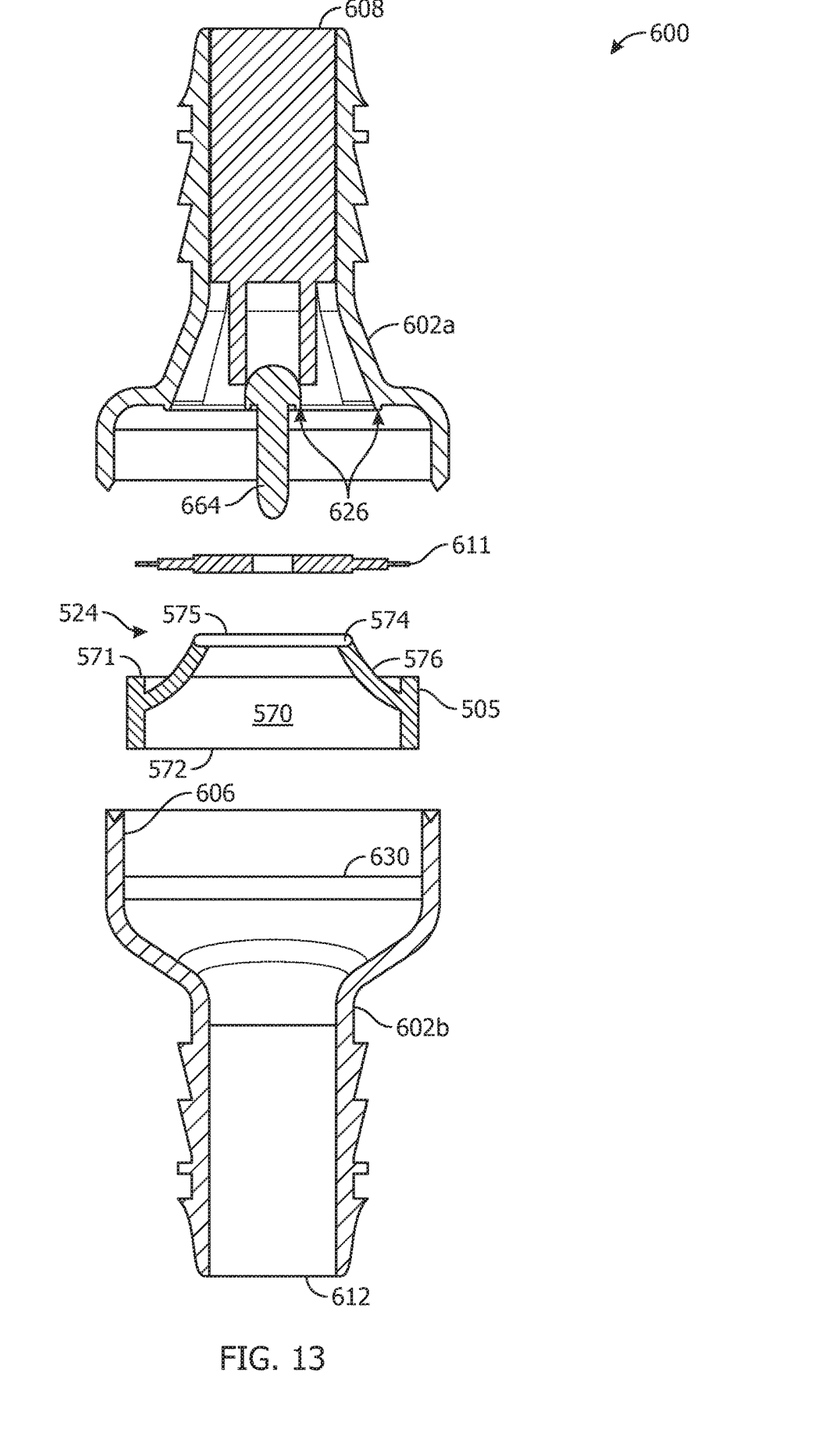
FIG. 13 is a longitudinal, cross-section view of a stand-alone check valve having a check valve insert.

Turning to FIGS. 7-12, variations of the check valve insert 505 are shown. Each of the check valve inserts 505a-505f define a first seat 524 for an open position of a check valve unit, such as any of the check valve units in the Venturi devices disclosed herein or in a stand-alone check valve, such as the one in FIG. 13. Each check valve insert 505a-505f has an outer support 570 seatable in an internal chamber 556, 566, 606 of a check valve unit 500, 600 (FIGS. 6 and 13). The outer support 570 has an upper surface 571 and a lower surface 572. Each check valve insert 505a-505f has an inner annular ring 574 spaced radially inward from the outer support 570 by a rib 576 that angles axially toward a central longitudinal axis C to position an upper surface 575 of the inner annular ring 574 a distance axially $D_1$ (labeled in FIG. 7) beyond the upper surface 571 of the outer support. As shown in FIGS. 7 and 8, the check valve insert 50 may have ten ribs connecting the inner annular ring 574 to the outer support 570. As shown in FIGS. 9-11, the check valve insert 505 may have four ribs 576 connecting the inner annular ring 574 to the outer support 570. As shown in FIG. 12, the check valve insert 505 may have two ribs 576 connecting the inner annular ring 574 to the outer support 570. These are just example embodiments and any number of ribs are possible, including a single rib.

The outer support 570 is illustrated in FIGS. 6-13 as an annular ring that is circular but is not limited thereto. In other embodiments, the outer support 570 may be oval or may be a polygonal-shaped ring. The inner annular ring 574 is typically circular in shape as shown in FIGS. 6, 8, 9, 11, and 12 or is oval in shape as shown in FIG. 10. The inner annular ring 574 in addition to being circular or oval in shape may have various configurations for the upper surface 575. In the embodiments illustrated in FIGS. 6, 8, and 11, the upper surface 575 is a continuous surface in one plane perpendicular to the central longitudinal axis C. In the embodiments illustrated in FIGS. 9, 10, and 12, the upper surface 575 undulates with two opposing troughs 579. In the embodiment, illustrated in FIG. 7, the upper surface 575 is angled downward and radially outward toward the outer support 570 over a minor arc extending 20 degrees up to 170 degrees along the inner annular ring 574, thereby defining an inclined surface portion 580 of the upper surface.

Turning now to FIG. 6, a Venturi device, generally designated 500, is disclosed that includes the check valve insert 505 described above. The Venturi device 500 may be connected to a device requiring vacuum, in particular one in an engine system, and includes a body 506 defining an extending from a motive port 508 to a discharge port 512. Additional ports of the body 506 include a pair of suction ports 510a, 510b and, optionally, dual bypass ports 514a, 514b. The suction port 510a and bypass port 514a (if present) are connected to a suction housing 407 with fluidtight/airtight seals, for example by sonic welding, heating, or other conventional methods for forming such seals. The suction housing 507 and the body 506, together, form check valve 520 and/or 521, which if present, each include a seal disc 511. The suction port 510b and bypass port 514b may be connected to a second suction housing as shown in FIG. 2, and if so, may each include a check valve insert 505 and a seal disc 511 in the same manner as check valves 520 and 521, or may be sealingly closed by integral bottoms or caps as shown in FIG. 4 (without a check valve or check valve insert present). Components of the Venturi device 500 not described below are understood to be analogous to those described above with respect to the other embodiments.

The body 506 has a first tapering portion and the second tapering portion aligned end to end with the motive outlet end 532 facing the discharge inlet end 534 and defining a Venturi gap 552 therebetween. The body 506 further defines a chamber 556 spacing the first suction port 510a and the second suction port 510b apart from one another by a distance $D_2$ at positions that are generally opposite one another, but both in fluid communication with the Venturi gap. The motive outlet end 532 extends into the chamber 556 at a position where the chamber 556 provides fluid flow around the entire outer surface of the motive outlet end 532, and the discharge inlet end 534 extends into the chamber 556 at a position where the chamber 556 provides fluid flow around the entire outer surface of the inlet end 534.

The chamber 556 and chamber 566 each have a first shoulder 530 protruding inward to define a seat to receive and retain one of the check valve inserts 505a-505f. A lower surface 572 of the check valve insert 505 is seated against the shoulder 530 to retain the check valve insert 505 in a position a pre-selected distance between the Venturi gap 552 and the first suction port 510a or bypass port 514a, respectively, to place the open position for the seal disc 511 at a preselected location. A seal disc 511 moveable within a chamber between an open position seated on the first valve seat 524 defined by the inner annular ring 575 of the first check valve insert 505 and a closed position is also housed with each of chambers 556 and 566, if both are present. Each seal disc 511 is translatable in response to a pressure difference across the opposing major surfaces of each seal disc itself.

Turning now to FIG. 13, a stand-alone check valve 600 is shown in an exploded view. The check valve 600 includes a housing 602a, 602b defining an internal cavity 606 in the assembled position (assembled with a fluidtight/airtight seal) having a pin 664 therein upon which is seated a seal disc 611 and defining a first port 608 in fluid communication with the internal cavity 606 and a second port 612 in fluid communication with the internal cavity 606, thereby defining a flow path from the first port through the chamber to the second port, or vice versa. The internal cavity 606 typically has larger dimensions than the first port 608 and the second port 612. In the illustrated embodiments, the first port 608 and the second port 612 are positioned opposite one another to define a generally linear flow path through the check valve 600, when the seal disc 611 is not present, but is not limited to this configuration. The portion of the housing defining the internal cavity 606 includes an internal first seat 524 upon which the seal disc seats when the check valve is open and a second seat 626 upon which the seal disc seats when the check valve is open. Here, the first seat 524 is defined by any of the check valve inserts 505 described herein, and the second seat 626 is one or more features on an inner surface of the internal cavity 606.

The internal cavity 606 has a shoulder 630 protruding inward that defines a seat for any other retaining feature to receive the check valve insert 505. A lower surface 572 of the check valve insert 505 is seated against the shoulder 630 to retain the check valve insert 505 in a preselected position within the internal cavity 606 to place the open position for the seal disc 611 at a preselected location. The seal disc 611 is moveable within the internal cavity 606 between the open position seated on the first valve seat 524 defined by an inner annular ring 574 of the check valve insert 505 and a closed position seated on the second valve seat 626. The seal disc 611 is translatable in response to a pressure differential across the opposing surfaces thereof.

In all embodiments, the check valve insert 505 may be pressfit within the housing or may have a snapfit thereto.

The seal disc 511, 611 may be made of a rigid material and as such can be seated against the first valve seat 524 of a check valve insert in an angled position relative to the central longitudinal axis C. In another embodiment, the seal disc 511, 611 may be flexible such that it can conform by bending to the shape defined by the upper surface 575 of the inner annular ring 574 of a check valve insert 505. The seal disc 511, 611 may be made of or may include an elastomeric material suitable for use under conditions existing in an operating system, such as an engine, i.e., engine temperatures and pressures. In one embodiment, the seal disc comprises a natural rubber, synthetic rubber, silicones, fluorosilicones, fluorocarbons, nitriles, EPDM, PTFE, or combinations thereof, but is not limited thereto.

The check valve insert as a separate and discrete component of the check valve is easier to manufacture, provides a more robust construction, and is an easier means to vary the construction of the check valve, i.e., changing the number of ribs or shape/contour of the inner annular ring. It improves the moldability of the check valve insert by reducing sink marks resulting from the injection molding process of plastics. Sink marks develop when material in the region of features such as ribs or bosses shrink more than material in the adjacent wall because of differential rates of cooling as a result of different thicknesses. Also, it improves the moldability of the lower body by removing features from the lower body that may have made it more difficult to lock core pins together. For example, it is easier to access the Venturi gap to lock core pins together, which assures that the motive and discharge ports are aligned, thereby providing for overall better performance of the Venturi device. Additionally, the check valve insert provides better support for the sealing disc with less section flow restriction because of the presence of the inner annular ring. The inner annular ring also enables the ribs to be thinner and fewer in number than individual fingers that defined the valve seat in the prior art.

Having described the invention in detail and by reference to preferred embodiments thereof, it will be apparent that modifications and variations are possible without departing from the scope of the invention which is defined in the appended claims.

What is claimed is:

1. A check valve insert defining a first seat for an open position of a check valve unit, the check valve insert comprising:
   an outer support ring seatable in an internal chamber of a check valve unit and having an upper surface, and a lower surface; and
   an inner annular ring spaced radially inward from the outer support by a plurality of ribs that each angle axially toward a central longitudinal axis to position an upper surface of the inner annular ring a distance axially beyond the upper surface of the outer support;
   wherein the inner annular ring defines a first flow path through the check valve insert in alignment with the central longitudinal axis, and immediately neighboring ribs of the plurality of ribs are spaced apart from one another and define secondary flow paths axially through the check valve insert that are parallel to the first flow path;
   wherein the upper surface of the inner annular ring undulates with two opposing troughs or the upper surface, along a minor arc extending 20 degrees up to 170 degrees of the 360 degrees of the inner annular ring, is angled downward axially and radially outward toward the outer support, thereby defining an inclined surface portion of the upper surface.

2. The check valve insert of claim 1, wherein the outer support is an annular ring or a polygonal-shaped ring.

3. The check valve insert of claim 1, wherein the inner annular ring is circular or oval in shape.

4. A check valve unit comprising:
 a two-part housing comprising a first housing part defining an inlet port and a second housing part defining an outlet port, wherein, when sealingly mated together, the first housing part and the second housing part collectively define a chamber in fluid communication with the inlet port and the outlet port, thereby defining a flow path from the inlet port through the chamber to the outlet port, wherein the chamber defines a seal seat for a closed position and either of the first housing part or the second housing part has a shoulder protruding inward into the chamber;
 a check valve insert seated on the shoulder in the chamber, the check valve insert comprising:
  an outer support having an upper surface and a lower surface, wherein the lower surface of the outer support is seated on the shoulder in the chamber; and
  an inner annular ring spaced radially inward from the outer support by a rib that angles axially toward a central longitudinal axis to position an upper surface of the inner annular ring a distance axially beyond the upper surface of the outer support;
  wherein the upper surface of the inner annular ring undulates with two opposing troughs or the upper surface, along a minor arc extending 20 degrees up to 170 degrees of the 360 degrees of the inner annular ring, is angled downward axially and radially outward toward the outer support, thereby defining an inclined surface portion of the upper surface; and
 a seal disc translatable linearly within the chamber in response to a pressure difference across the seal disc itself to move the seal disc from an open position seated on the upper surface of the inner annular ring of the check valve insert to the closed position seated solely against the seal seat of the chamber.

5. The check valve unit of claim 4, wherein the outer support is an annular ring or a polygonal-shaped ring.

6. The check valve unit of claim 4, wherein the inner annular ring is circular or oval in shape.

7. The check valve unit of claim 4, wherein a plurality of circumferentially spaced apart ribs space the inner annular ring from the outer support.

8. The check valve unit of claim 4, wherein the outlet port is a Venturi gap of a Venturi device.

9. The check valve unit of claim 4, wherein the outlet port is a bypass port of a Venturi device.

10. The check valve unit of claim 9, wherein the bypass port is positioned downstream of a Venturi gap.

11. A Venturi device comprising:
 a body defining a passageway having a motive section and a discharge section spaced a distance apart from one another to define a Venturi gap, both of which converge toward the Venturi gap, and defining a chamber housing the Venturi gap and having a first suction port in fluid communication with the Venturi gap; wherein the chamber has a first shoulder protruding inward and positioned a pre-selected distance between the Venturi gap and the first suction port;
 a first check valve insert seated on the first shoulder in the chamber, the check valve insert comprising:
  an outer support ring seatable in the chamber and having an upper surface and a lower surface; and
  an inner annular ring spaced radially inward from the outer support by a plurality of ribs that each angle axially toward a central longitudinal axis to position an upper surface of the inner annular ring a distance axially beyond the upper surface of the outer support,
  wherein the upper surface of the inner annular ring undulates with two opposing troughs or the upper surface, along a minor arc extending 20 degrees up to 170 degrees of the 360 degrees of the inner annular ring, is angled downward axially and radially outward toward the outer support, thereby defining an inclined surface portion of the upper surface;
  wherein the inner annular ring defines a first flow path through the check valve insert in alignment with the central longitudinal axis, and immediately neighboring ribs of the plurality of ribs are spaced apart from one another and define secondary flow paths axially through the check valve insert that are parallel to the first plow flow path; and
 a first seal disc moveable within the chamber between an open position seated on the upper surface of the inner annular ring of the first check valve insert and a closed position; wherein the first seal disc is translatable in response to a pressure difference across the first seal disc itself; and
 a first suction housing sealingly connected to the first suction port to collectively form a first check valve chamber; wherein the suction housing defines a valve seat for the closed position.

12. The Venturi device of claim 11, wherein the body further defines a second suction port in fluid communication with the Venturi gap.

13. The Venturi device of claim 12, further comprising a cap sealingly connected to the second suction port of the body.

14. The Venturi device of claim 12, further comprising a second suction housing sealingly connected to the second suction port of the body to collectively form a second check valve chamber.

15. The Venturi device of claim 11, wherein the chamber has a second shoulder protruding inward and positioned a pre-selected distance between the Venturi gap and the second suction port, and a second check valve insert seated on the second shoulder in the chamber, the second check valve insert comprising:
 an outer support seatable in the chamber and having an upper surface and a lower surface; and
 an inner annular ring spaced radially inward from the outer support by a rib that angles axially toward a central longitudinal axis to position an upper surface of the inner annular ring a distance axially beyond the upper surface of the outer support.

16. The Venturi device of claim 15, further comprising a second seal disc moveable within the second check valve chamber between an open position seated on the upper surface of the inner annular ring of the second check valve insert and a closed position; wherein the second seal disc is translatable in response to a pressure difference across the second seal disc itself.

17. The Venturi device of claim 11, wherein an outlet end of the motive section extends into the chamber defined by the body at a position where the chamber provides fluid flow around the entire outer surface of the outlet end, and an inlet end of the discharge section extends into the chamber at a position where the chamber provides fluid flow around the entire outer surface of the inlet end of the discharge section.

* * * * *